(12) United States Patent
Horio et al.

(10) Patent No.: US 7,027,291 B2
(45) Date of Patent: Apr. 11, 2006

(54) SOLID ELECTROLYTIC CAPACITOR

(75) Inventors: Kazutoyo Horio, Saga (JP); Takayuki Matsumoto, Takeo (JP); Tetsuyuki Sakuda, Imari (JP); Manabu Yamaguchi, Saga (JP); Kazuhiro Aihara, Saga (JP); Shinji Arimori, Saga (JP)

(73) Assignees: Sanyo Electric Co., Ltd., Moriguchi (JP); Saga Sanyo Industries Co., Ltd., Saga (JP)

( * ) Notice: Subject to any disclaimer, the term of this patent is extended or adjusted under 35 U.S.C. 154(b) by 0 days.

(21) Appl. No.: 10/933,488

(22) Filed: Sep. 3, 2004

(65) Prior Publication Data

US 2005/0105249 A1    May 19, 2005

(30) Foreign Application Priority Data

Sep. 5, 2003  (JP) .............................. 2003-313548
Feb. 5, 2004  (JP) .............................. 2004-028876

(51) Int. Cl.
*H01G 9/00* (2006.01)

(52) U.S. Cl. ...................... 361/523; 361/525; 361/528; 361/530; 361/534; 361/536; 29/25.03

(58) Field of Classification Search ................ 361/523, 361/524, 525, 528, 529, 504, 508, 516, 519, 361/520, 530–541; 29/25.03
See application file for complete search history.

(56) References Cited

U.S. PATENT DOCUMENTS

| | | | |
|---|---|---|---|
| 6,574,093 B1 * | 6/2003 | Kida et al. | 361/516 |
| 6,594,141 B1 * | 7/2003 | Takada | 361/523 |
| 6,671,167 B1 * | 12/2003 | Araki et al. | 361/523 |
| 6,751,086 B1 * | 6/2004 | Matsumoto | 361/523 |
| 6,903,922 B1 * | 6/2005 | Sano et al. | 361/533 |
| 6,912,117 B1 * | 6/2005 | Arai et al. | 361/523 |

FOREIGN PATENT DOCUMENTS

JP    2002-246268    8/2002

* cited by examiner

*Primary Examiner*—Nguyen T. Ha
(74) *Attorney, Agent, or Firm*—Armstrong, Kratz, Quintos, Hanson & Brooks, LLP

(57) ABSTRACT

A solid electrolytic capacitor including a capacitor element having an anode body partly provided with a cathode layer, an anode-side and a cathode-side lead frame attached to a lower surface of the capacitor element, and a housing covering the lead frames and the capacitor element except lower surfaces of the lead frames. The housing covers an outer end face of each of the lead frames, the outer end face of each lead frame being provided with a filling portion filled with a resin forming the housing.

5 Claims, 8 Drawing Sheets

SOLID ELECTROLYTIC CAPACITOR

FIELD OF THE INVENTION

The present invention relates to solid electrolytic capacitors.

BACKGROUND OF THE INVENTION

FIG. 16 shows a solid electrolytic capacitor of the chip type which is well known in the art (see JP-A No. 2002-246268).

The solid electrolytic capacitor 1 shown in FIG. 16 comprises a capacitor element 2 having lead frames 9, 90 attached to the bottom surface thereof. The capacitor element 2 is covered with a housing 70 of synthetic resin. The lead frames 9, 90 are bent along the housing 70. The capacitor element 2 comprises a dielectric oxide coating 21 formed on a portion of an anode body 20 which is foil of valve metal, and a cathode layer 3, a carbon layer 6 and a silver paste layer 60 successively formed over the oxide coating 21. The portion of the anode body 20 provided with the dielectric oxide coating 21 serves as a cathode 2b, and the uncoated portion of the anode body 20 not covered with the oxide coating 21 serves as an anode 2a. For the convenience of illustration, the cathode layer 3, carbon layer 6 and silver paste layer 60 are each shown in FIG. 16 as a thick layer, whereas the anode body 20 is nearly a flat sheet in actuality.

The term "valve metal" refers to a metal which forms an extremely compact dielectric oxide coating having durability when treated by electrolytic oxidation. Al (aluminum), Ta (tantalum) and Ti (titanium) are such metals.

The solid electrolytic capacitor 1 has a great height in its entirety since the lower surface of the capacitor element 2 is away from the bottom surface of the housing 70 in the direction of height. However, it is required that such capacitors be made thinner. To meet the requirement, a solid electrolytic capacitor is available which has lead frames 9, 90 each in the form of a flat plate and wherein the lower surface of a capacitor element 2 is positioned closer to the bottom surface of a housing 70 as shown in FIG. 17 (see JP-A No. 2002-25858). In the case of the capacitor 1 shown in FIG. 17, the lower surfaces of the cathode-side lead frame 90 and the anode-side lead frame 9 have approximately the same shape.

The aforementioned publication, JP-A No. 2002-246268, also discloses a capacitor element 2 which, as shown in FIG. 18, comprises a plurality of anode bodies 20, 20 adhered or welded to each other at their anode (2a) ends and having increased capacitance.

Although the solid electrolytic capacitors 1 shown in FIGS. 17 and 18 are reduced in thickness, the lead frames 9, 90 are joined to the housing 70 in intimate contact therewith with a low strength. In other words, with the capacitor 1 of FIG. 16, the housing 70 covers the upper portion of each of the lead frames 9, 90 over the upper and lower surfaces thereof and is joined to the lead frame with a great strength, whereas with the capacitors 1 shown in FIGS. 17 and 18, the housing 70 is in contact with the lead frames 9, 90 only over one surface of each lead frame and therefore over a smaller area than is the case with the capacitor of FIG. 16. Thus, the strength of the joint between the housing 70 and the lead frames 9, 90 is lower in the capacitors 1 of FIGS. 17, 18 than in the capacitor 1 of FIG. 16.

Accordingly, water is liable to ingress into the capacitor through the joint (indicated at M in FIG. 18) between the housing 70 and the lead frames 9, 90. If water reaches the capacitor element 2, the element is prone to deteriorate. The capacitor 1 therefore still remains to be improved in moisture resistant characteristics.

SUMMARY OF THE INVENTION

An object of the present invention is provide a solid electrolytic capacitor 1 wherein a housing is joined to lead frames in intimate contact therewith with a high strength and which has excellent moisture resistant characteristics while having a reduced thickness.

A housing 70 covering a capacitor element 2 covers an outer end face of each of lead frames 9, 90, and the outer end face of each lead frame is provided with a filling portion 92 filled with a resin forming the housing 70.

The lead frames 9, 90 are each provided in a lower surface thereof with a recessed face 91 filled with the resin forming the housing 70.

An end portion lower face of each of the lead frames 9, 90 is positioned in a cutting surface 71 of the housing 70 and provided with a recess 93 covered with the resin forming the housing 70 to prevent the end portion lower face of each lead frame from being exposed.

ADVANTAGES OF THE INVENTION

1. With the solid electrolytic capacitor 1 of the invention, the lead frames 9, 90 are each provided in the outer end face thereof with a filling portion 92 which is filled with the resin forming the housing 70. The resin thus covering the outer end faces of the lead frames 9, 90 and filling the portion 92 enhances the strength of the joint between the housing 70 and the lead frames 9, 90 even if the capacitor 1 has a reduced thickness, consequently giving improved moisture resistant characteristics to the capacitor 1.

2. The lead frames 9, 90 are each provided in the lower surface thereof with a recessed face 91 filled with the resin forming the housing 70. This permits the capacitor element 2 to be in contact with the lead frames 9, 90 over increased areas, enhancing the strength of the joint between the housing 70 and the lead frames 9, 90 while resulting in diminished ESR (equivalent series resistance).

3. With the recess 93 covered with the resin forming the housing 70, the end portion lower face of each of the lead frames 9, 90 positioned in the cutting surface 71 of the housing 70 is prevented from being exposed, consequently precluding burrs to be formed when each lead frame is cut from projecting outward. The deburring step can therefore be dispensed with to reduce the number of steps to be included in the fabrication process. The resin covering the recess 93 also gives an increased strength to the joint between the housing 70 and each lead frame.

DETAILED DESCRIPTION OF THE PREFERRED EMBODIMENTS

[First Embodiment]

An embodiment of the invention will be described below in detail with reference to the drawings concerned.

Figure 1:
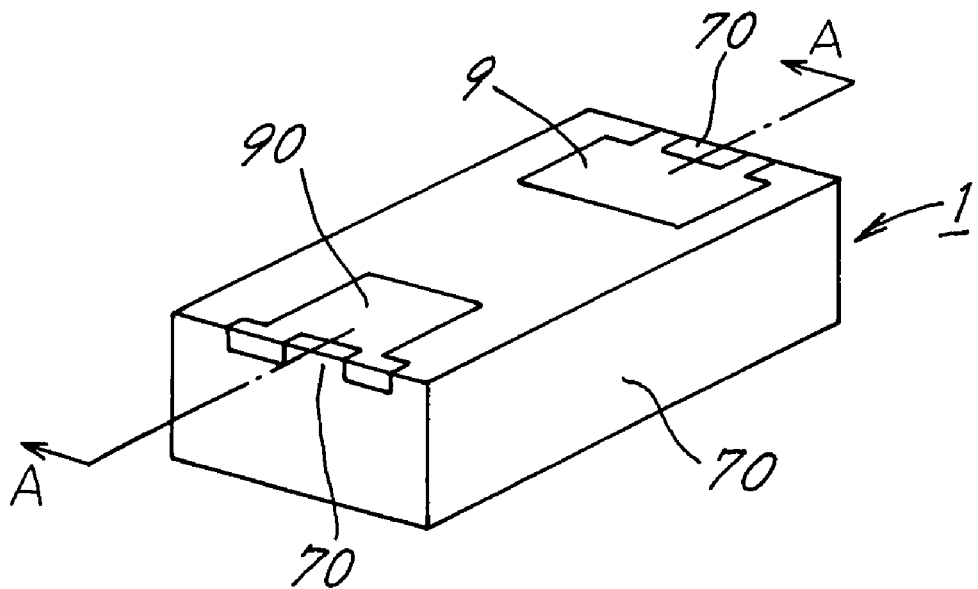
FIG. 1 is a perspective view showing a solid electrolytic capacitor as turned upside down.
Figure 2:
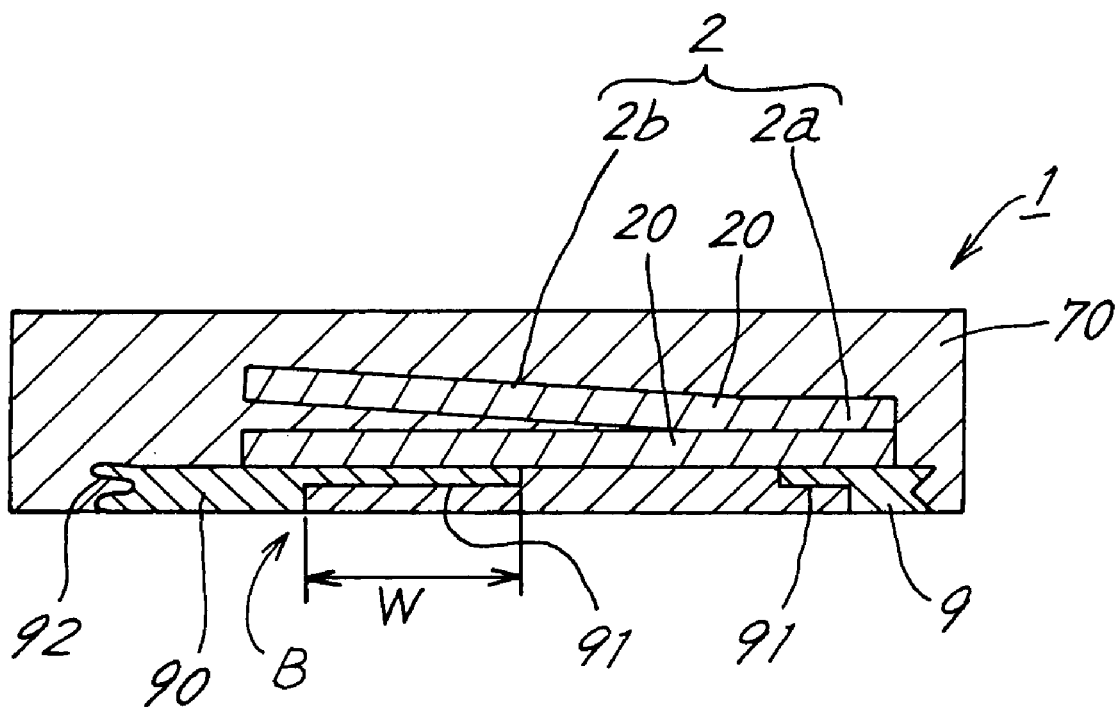
FIG. 2 is a view of the capacitor in section taken along a plane containing the line A—A in FIG. 1.

FIG. 1 is a perspective view showing a solid electrolytic capacitor 1 as turned upside down. FIG. 2 is a view in section taken along a plane containing the line A—A in FIG. 1 and showing the capacitor with its upper and lower sides positioned in reversed relation to FIG. 1.

As shown in FIG. 2, the capacitor 1 comprises a capacitor element 2 having lead frames 9, 90 attached to the lower side thereof. The capacitor element 2 is covered with a housing 70 of epoxy resin or like synthetic resin. The capacitor element 2 has the same shape as the conventional one shown in FIG. 18, and comprises superposed anode bodies 20, 20 adhered or welded to each other at their anode (2a) ends. The lead frame 90 for the cathode is provided over the lower surface of the element 2. The capacitor element 2 is in contact with the cathode-side lead frame 90 over an increased area to ensure reduced ESR.

The capacitor element 2 is fabricated by the process to be described below. The process is the same as the conventional one. First, an anode body 20 in the form of a strip is cut out from a sheet of aluminum foil, and a portion of the anode body 20 is immersed in an aqueous solution of phosphoric acid or adipic acid having a concentration of 0.01 to 0.02 wt. % for an electrolytic oxidation treatment to form a dielectric oxide coating 21. The coated portion of the anode body 20 covered with the oxide coating 21 is then immersed in a solution of 3,4-ethylenedioxythiophane and ferric p-toluene-sulfonate in butanol to form a cathode layer 3 of electrically conductive high polymer which is polythiophene. A carbon layer 6 and a silver paste layer 60 are then formed over the cathode layer 3 in this order. A plurality of anode bodies 21 prepared in this way are then lapped over each other, and anodes 2a, 2a are adhered or welded together, whereby the capacitor element 2 is completed.

In addition to polythiophene, examples of other materials for forming the cathode layer 3 are polypyrrole, polyaniline, polyfuran and like conductive high polymers, TCNQ (7,7,8,8-tetracyanoquinodimethane) complex salt, etc. Use of a conductive high polymer or the like having a low resistance value results in diminished ESR to provide capacitors having outstanding high-frequency characteristics.

Each of the lead frames 9, 90 extending longitudinally of the capacitor 1 is provided in the outer end face thereof with a filling portion 92 which is filled with the resin forming the housing 70. In section, the filling portion 92 is in the form of an indentation defined by projections positioned respectively above and below the indentation.

Figure 3:
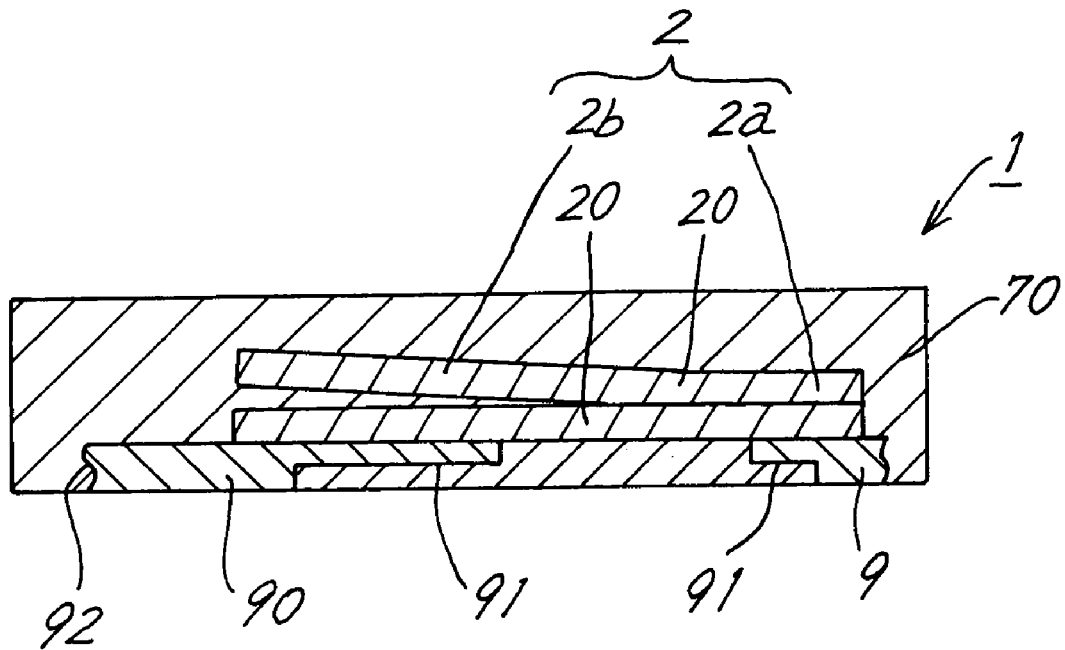
FIG. 3 is a sectional view of another solid electrolytic capacitor.
Figure 4:
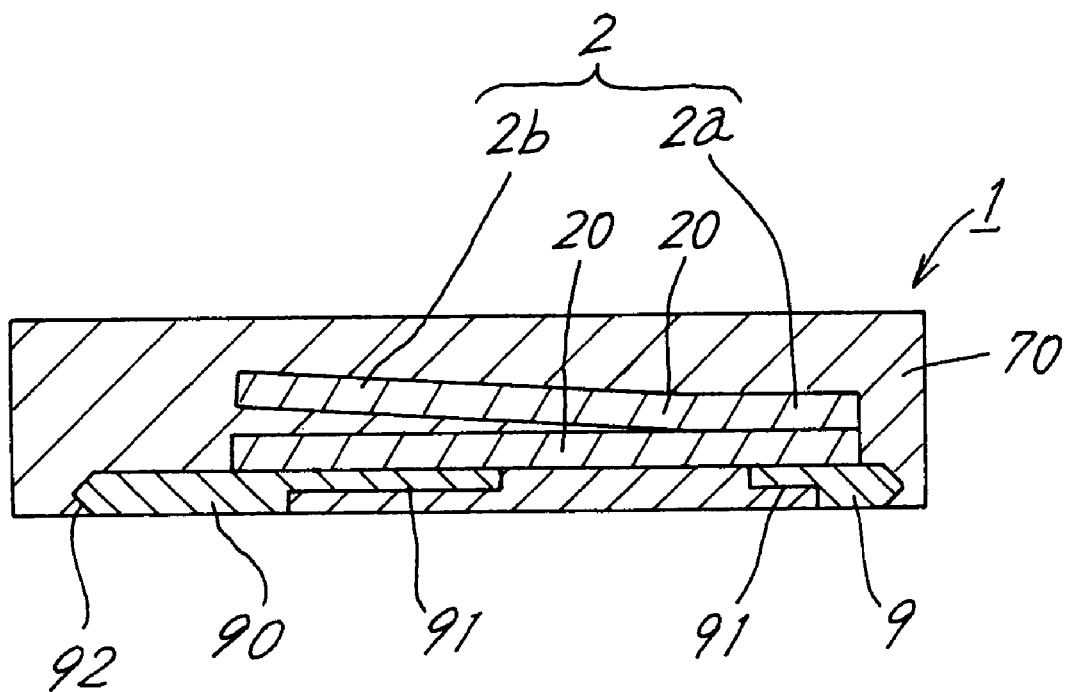
FIG. 4 is a sectional view of another solid electrolytic capacitor.

Thus, the outer end face of each of the lead frames 9, 90 is covered with the resin, which also fills the filling portion 92, so that even if the capacitor 1 is thin, the lead frames 9, 90 are joined to the housing 70 in intimate contact therewith with an enhanced strength. This gives the capacitor 1 improved moisture resistant characteristics. The filling portions 92 of the lead frames 9, 90 may be S-shaped in section as shown in FIG. 3, V-shaped in section as shown in FIG. 4, or in the form of a wedgelike recess although not shown.

The lower surface of each of the lead frames 9, 90 has a recessed face 91 formed by half etching or forming by compression. The recessed face 91 in the cathode-side lead frame 90 is 1 to 4 mm in left-to-right length W. The recessed face 91 is covered with the resin forming the housing 70. The recessed faces 91, 91 formed give increased areas of contact between the capacitor element 2 and the lead frames 9, 90 and reduced ESR (equivalent series resistance), and increases the strength of joint between the housing 70 and the lead frames 9, 90. The recessed face 91 provided further increases the distance from the boundary (point B in FIG. 2) between the recessed face 91 and the housing to the capacitor element 2, diminishing the likelihood of water reaching the capacitor element 2. The capacitor element 2 is attached to the lead frames 9, 90 by resistance welding, leaving marks of resistance welding on the recessed faces 91. However, the resin covering the recessed faces 91 conceals the spot marks to make the capacitor appear neat.

The solid electrolytic capacitor 1 is fabricated by the process to be described below.

Figure 5:
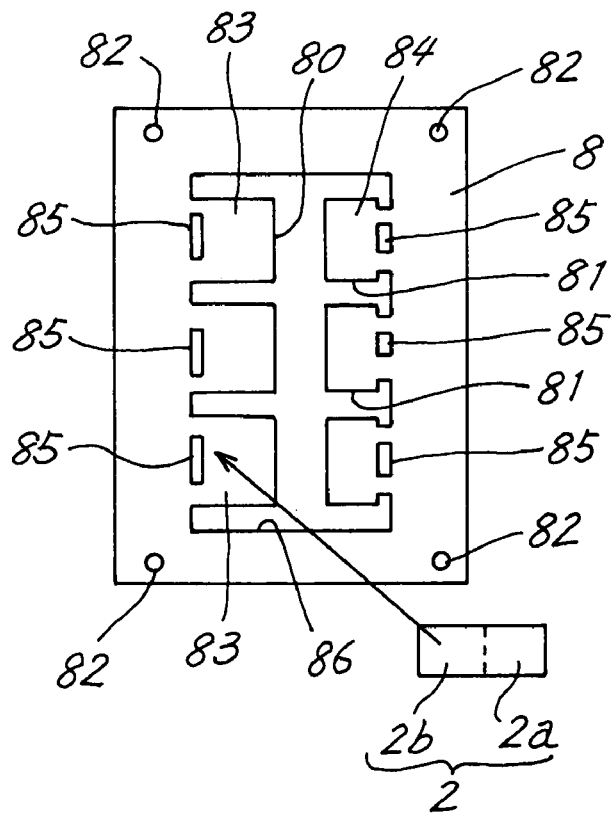
FIG. 5 is a plan view of a metal plate for making lead frames.

FIG. 5 is a plan view of a metal plate 8 for making the lead frames 9, 90. First, the metal plate 8, which consists mainly of copper, is punched to form a vertically elongated first opening 80 and horizontally elongated second openings 81, 81 arranged vertically at approximately equal intervals on opposite sides of the first opening 80. At this time, jig passing holes 82 are formed respectively at four corners of the plate 8.

The portion of the metal plate 8 positioned on the left side of the first opening 80 and other than the second openings 81, 81 provides terminal pieces 83 for making cathode-side lead frames 90. The portion of the metal plate 8 positioned on the right side of the first opening 80 and other than the second openings 81, 81 provides terminal pieces 84 for making cathode-side lead frames 9. Each pair of terminal pieces 83, 84 have their inner ends opposed to each other with the first opening 80 positioned therebetween.

Figure 6:
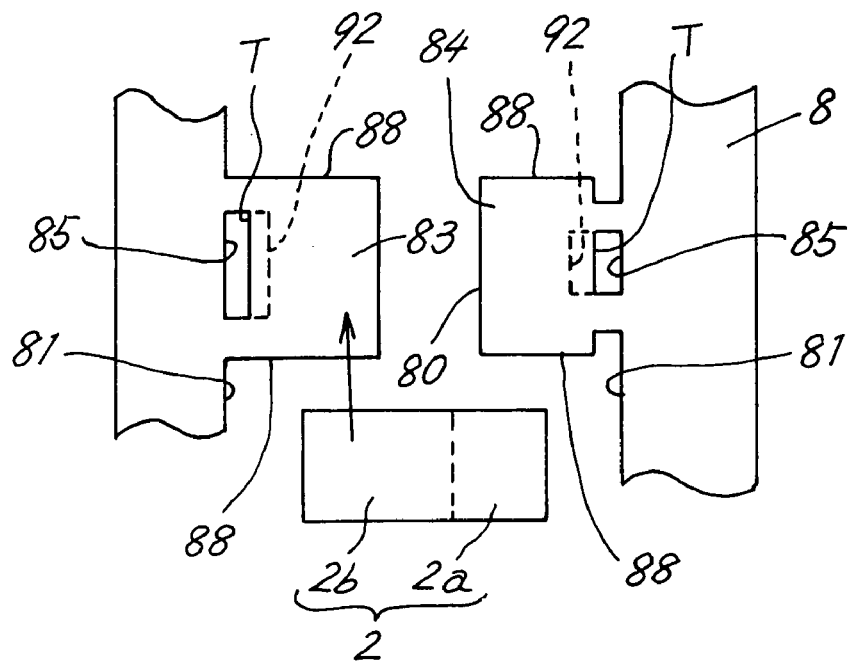
FIG. 6 is an enlarged fragmentary view of FIG. 5.

The pair of terminal pieces 83, 84 are provided at base end portions thereof with resin passing holes 85, 85 formed by etching. At this time, the above-mentioned filling portion 92, generally W-shaped, is formed in the inner end face T defining each of the resin passing holes 85, 85 by etching the metal plate 8 on opposite surfaces thereof as shown on an enlarged scale in FIG. 6. The recessed faces 91, 91 (see FIG. 2) are further formed in the terminal pieces 83, 84 in the rear surfaces thereof by half etching or by forming by compression. The applicant gives a thickness of about 0.25 mm to the lead frames 9, 90 and a depth of about 0.125 mm to the recessed faces 91, whereas the lead frames are not limited to this thickness or depth.

Incidentally, the first opening 80 and the second openings 81, 81 may be formed simultaneously with the resin passing holes 85, 85 by etching. A filling portion 92 may be formed in each of the terminal pieces 83, 84 at the outer ends 88 extending longitudinally of the capacitor element 2.

The capacitor element 2 is placed on the pair of terminal pieces 83, 84 across the first opening 80. The anode 2a of the capacitor element 2 is placed on the terminal piece 84 for making the anode-side lead frame 9, while the cathode 2b is placed on the terminal piece 83 to be made into the cathode-side lead frame 90. The capacitor element 2 has its anode 2a joined to the terminal piece 84 by resistance welding and its cathode 2b connected to the terminal piece 83 with a conductive adhesive. All the other cathodes 2b are connected to the terminal piece 83 with a conductive adhesive. At this time, the capacitor element 2 leaves the resin passing holes 85, 85 uncovered therewith.

Figure 7:
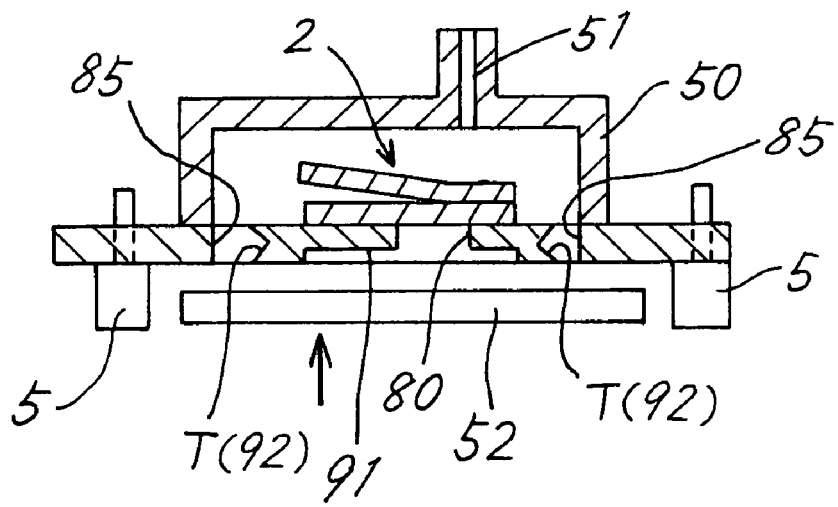
FIG. 7 is a view showing a molding process.

Subsequently as shown in FIG. 7, support jigs 5 are inserted through the jig passing holes 82 of the metal plate 8, which is in turn held from above by pressure means (not shown) and fixed onto the jigs 5.

Figure 8:
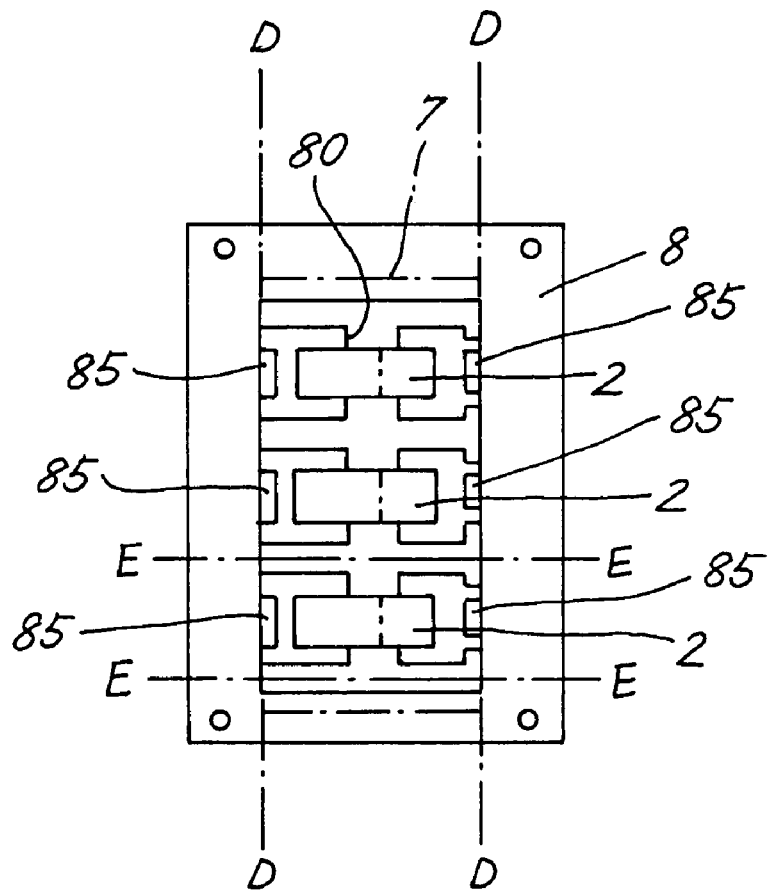
FIG. 8 is a plan view of the metal plate after molding.

A die 50 and a support die 52 are fitted to the metal plate 8 from above and below, respectively. Inside edges of the mold 50 are in register with the corresponding outer edges of the resin passing holes 85. A molten resin is injected into the die 50 through a gate 51. Portions of the molten resin fill up the resin passing holes 85, 85 and the filling portions 92. After the molten resin is cooled, the two dies 50, 52 are separated, whereby a resin block 7 for making the housing 70 is formed on the metal plate 8 shown in FIG. 8. The resin block 7 and the metal plate 8 are cut as by a dicing saw along planes containing the respective lines D—D and lines E—E shown in FIG. 8 to cut off the portions of the terminal pieces 83, 84 positioned externally of the resin block 7, whereby the solid electrolytic capacitor 1 is obtained.

The resin block 7 is molded by a transfer molding machine for practicing molding processes including the above injection molding process. Alternatively, the resin block 7 may be formed by screen printing.

Figure 16:
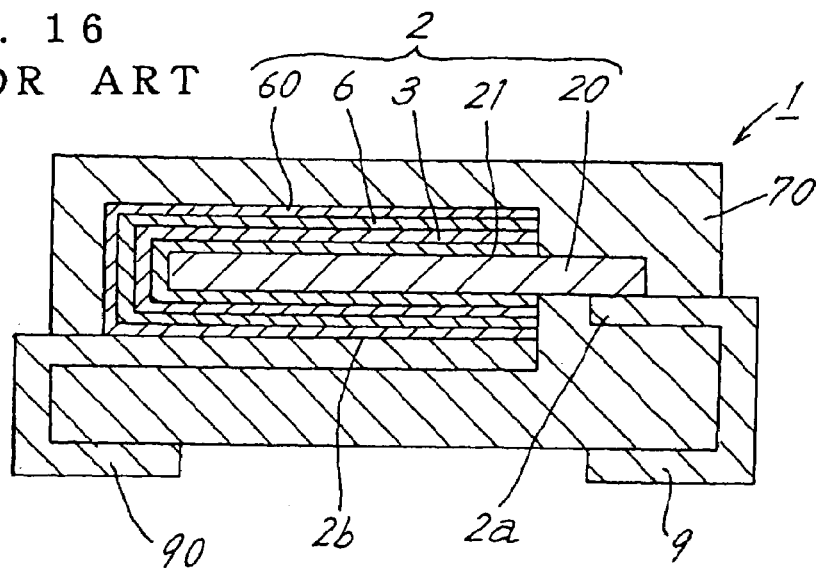
FIG. 16 is a sectional view of a conventional solid electrolytic capacitor.
Figure 17:
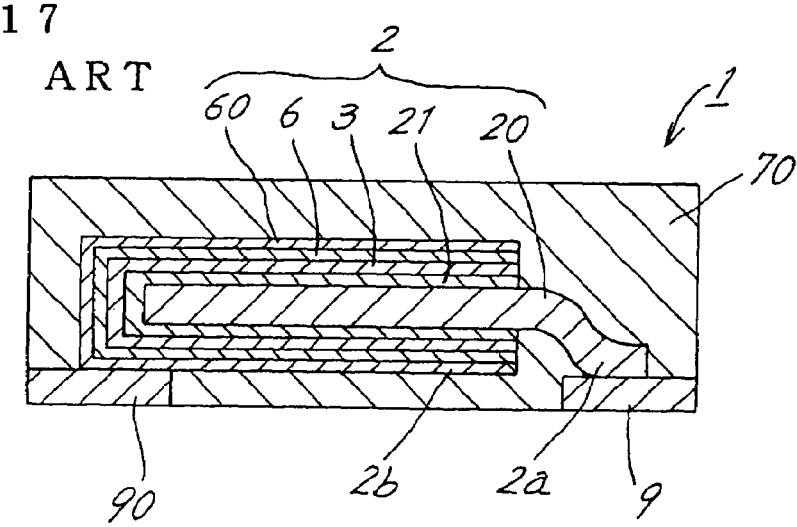
FIG. 17 is a sectional view of a another conventional solid electrolytic capacitor.
Figure 18:
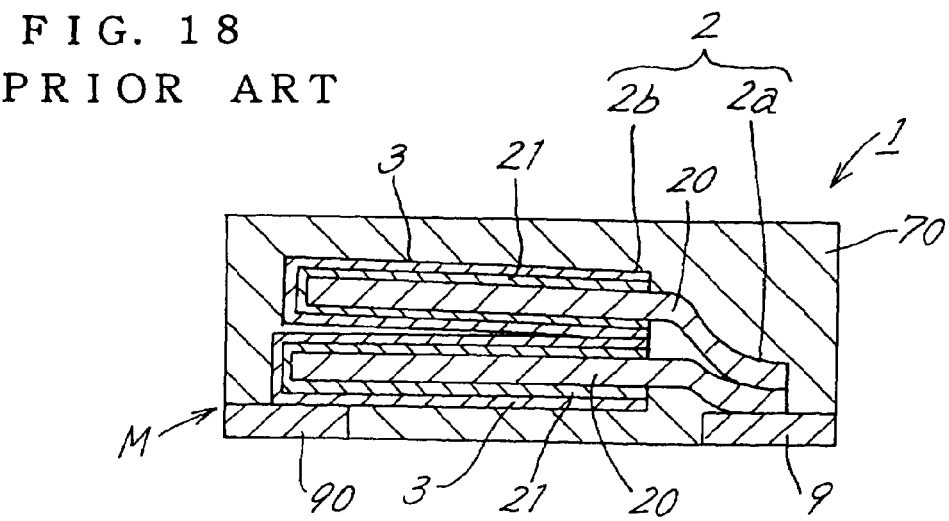
FIG. 18 is a sectional view of another conventional solid electrolytic capacitor.

The present applicant fabricated conventional solid electrolytic capacitors 1 of FIG. 16 as Conventional Example 1 and conventional solid electrolytic capacitors 1 of FIG. 18 as Conventional Example 2. The capacitors of each type made were twenty in number. The applicant also fabricated solid electrolytic capacitors 1 of the present embodiment shown in FIG. 2, twenty in number. The capacitors 1, which were all 16 V in rated voltage and 10 μF in capacitance, were tested for moisture resistance by allowing the capacitors to stand in an environment of +60° C. and relative humidity of 90% for 500 hours and thereafter checking the capacitors for a reduction in capacitance. The value of capacitance variation is the average for 20 capacitors. The result listed in the table below reveals that the solid electrolytic capacitor 1 of the present embodiment is improved in moisture resistant characteristics as compared with Conventional Example 2, i.e., the solid electrolytic capacitor 1 of the same thin type.

TABLE 1

| | Capacitance variation ratio (%) |
|---|---|
| Conventional Example 1 | 10% |
| Conventional Example 2 | 30% |
| Embodiment | 10% |

The solid electrolytic capacitor 1 of the present embodiment has filling portions 92 formed in the outer end faces of the lead frames 9, 90 and filled with the resin forming the housing 70. Thus, the outer end faces of the lead frames 9, 90 are covered with the resin, which also fills up the filling portions 92. Even if the capacitor 1 is thin, the housing 70 is therefore joined to the lead frames 9, 90 with an enhanced strength, consequently giving the capacitor 1 improved moisture resistant characteristics. This is substantiated also by the Table 1 given above. Thus, although reduced in height, the capacitor 1 can be made equivalent to Conventional Example 1 in moisture resistant characteristics.

Further the lead frames 9, 90 are provided in their lower surfaces with recessed faces 91 which are covered with the resin forming the housing 70. This gives increased areas of contact between the capacitor element 2 and the lead frames 9, 90, enhancing the strength of the joint between the housing 70 and the lead frames 9, 90 while resulting in reduced ESR (equivalent series resistance).

[Second Embodiment]

Figure 9:
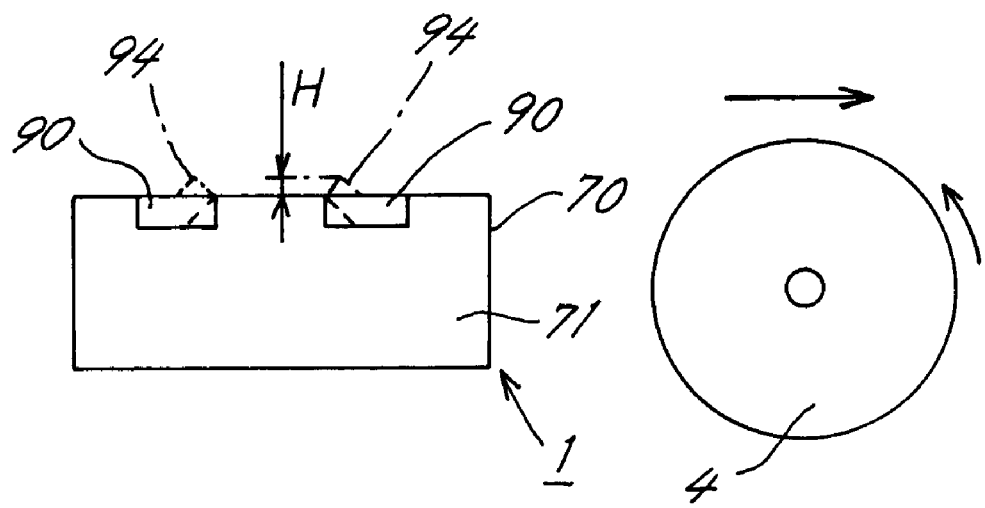
FIG. 9 is left side elevation of the capacitor of FIG. 1.

FIG. 9 is a left side elevation of the solid electrolytic capacitor 1 of FIG. 1. The capacitor 1 is obtained by cutting the resin block 7 and metal plate 8 by a cutting tool 4 such as a dicing saw. As shown in FIG. 9, one side surface of the housing 70 is in the form of a cutting surface 71 formed by the cutting tool 4. The end portion lower faces of the lead frames 9, 90 which are positioned in the cutting surface 71 of the housing 70 are left exposed.

The cutting tool 4 cuts the metal plate 8 while in rotation, so that when the resin block 7 and the metal plate 8 are cut by the tool 4, burrs 94 are likely to project from the end portion lower faces of the lead frames 9, 90 owing to the resistance of friction between the cutting tool 4 and the metal plate 8. While capacitors 1 of the type described are mounted on a circuit board (not shown), formation of such burrs 94 will vary the height of the capacitor 1 as mounted. The step of removing burrs is therefore necessary, consequently increasing the number of steps included in the fabrication process.

Figure 10:
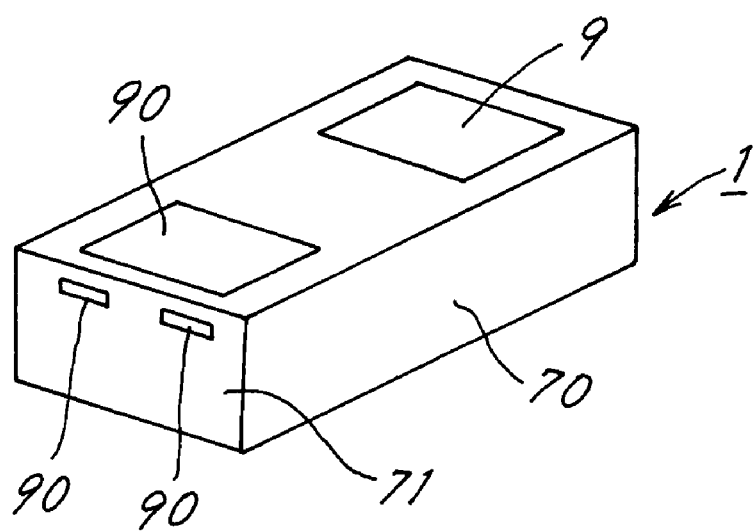
FIG. 10 is a perspective view of another solid electrolytic capacitor as turned upside down.

In an attempt to eliminate variations in the height of capacitors mounted, the present applicant has proposed the capacitor 1 shown in FIG. 10. With this capacitor, the ends of the lead frames 9, 90 positioned in the cutting surface 71 are given a reduced thickness, and the frame end portion lower faces are covered with resin. (FIG. 10 shows the capacitor 1 as turned upside down.) This obviates the likelihood that burrs 94 will project from the end portion lower faces of the lead frames 9, 90 when the resin block 7 and the metal plate 8 are cut by a dicing saw.

The capacitor 1 is fabricated by the process to be described below. The capacitor element 2 to be used is the same as the one shown in FIG. 2.

Figure 11:
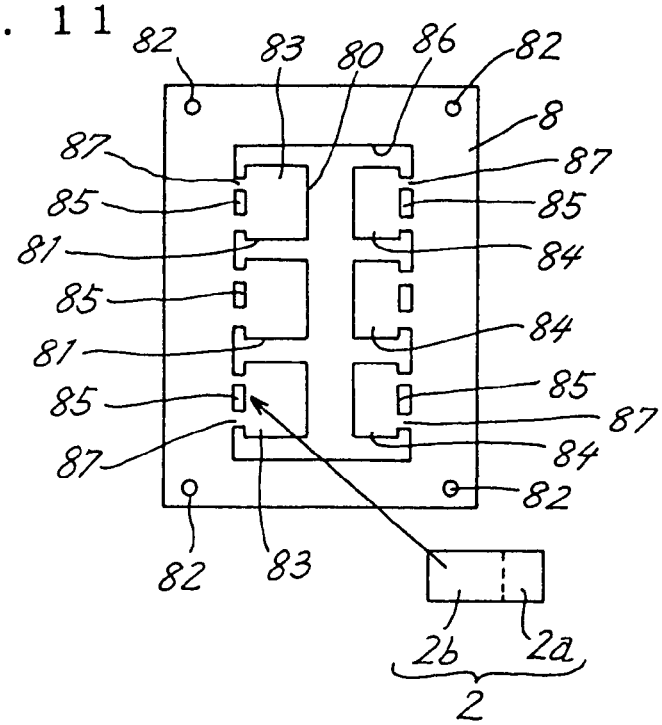
FIG. 11 is a plan view of a metal plate for making lead frames of the capacitor of FIG. 10.

FIG. 11 is a plan view showing the metal plate 8 to be made into lead frames 9, 90. First, the metal plate 8 is punched to form a large rectangular aperture 86 therein. The large aperture 86 has a vertically elongated first opening 80 and horizontally elongated second openings 81, 81 arranged vertically at approximately equal intervals on opposite sides of the first opening 80. Jig passing holes 82 are formed at respective corners of the plate 8.

The remaining portion of the metal plate 8 positioned on the left side of the first opening 80 provides terminal pieces 83 for making cathode-side lead frames 90. The remaining portion of the metal plate 8 positioned on the right side of the first opening 80 provides terminal pieces 84 for making cathode-side lead frames 9. Each pair of terminal pieces 83, 84 have their inner ends opposed to each other with the first opening 80 positioned therebetween.

The pair of terminal pieces 83, 84 are connected by connectors 86 to the inner peripheral edge of the metal plate 8 defining the large aperture 86.

The pair of terminal pieces 83, 84 are provided at base end portions thereof with resin passing holes 85, 85 formed by etching. The aforementioned filling portion 92 may be formed in the inner end face defining each of the resin passing holes 85, 85.

Figure 12:
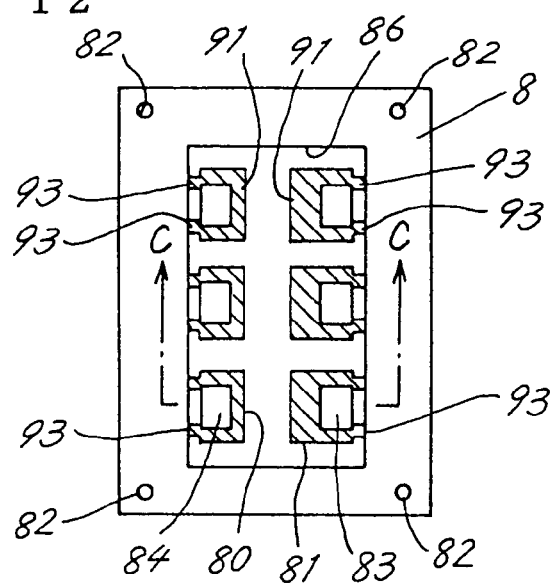
FIG. 12 is a rear side view of the metal plate of FIG. 11.

FIG. 12 is a rear side view of the metal plate 8 of FIG. 11. Recessed faces 91, 91 are formed by half etching or compression forming in the lower surfaces of the terminal pieces 83, 84 at the peripheral edge portions thereof as indicated by hatching in FIG. 12. A recess 93 is formed also in the lower surface of each connector 87 by half etching or compression forming as indicated by hatching.

Figure 13:
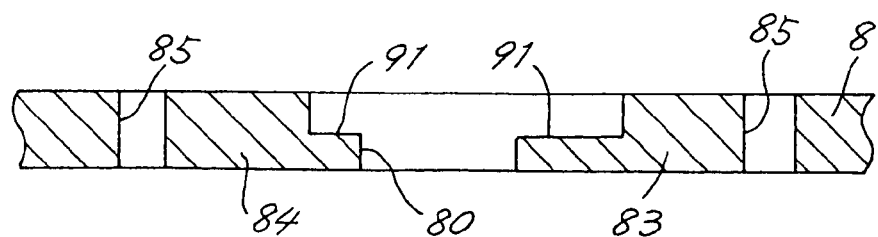
FIG. 13 is a view in section taken along a plane containing the line C—C in FIG. 12.
Figure 14:
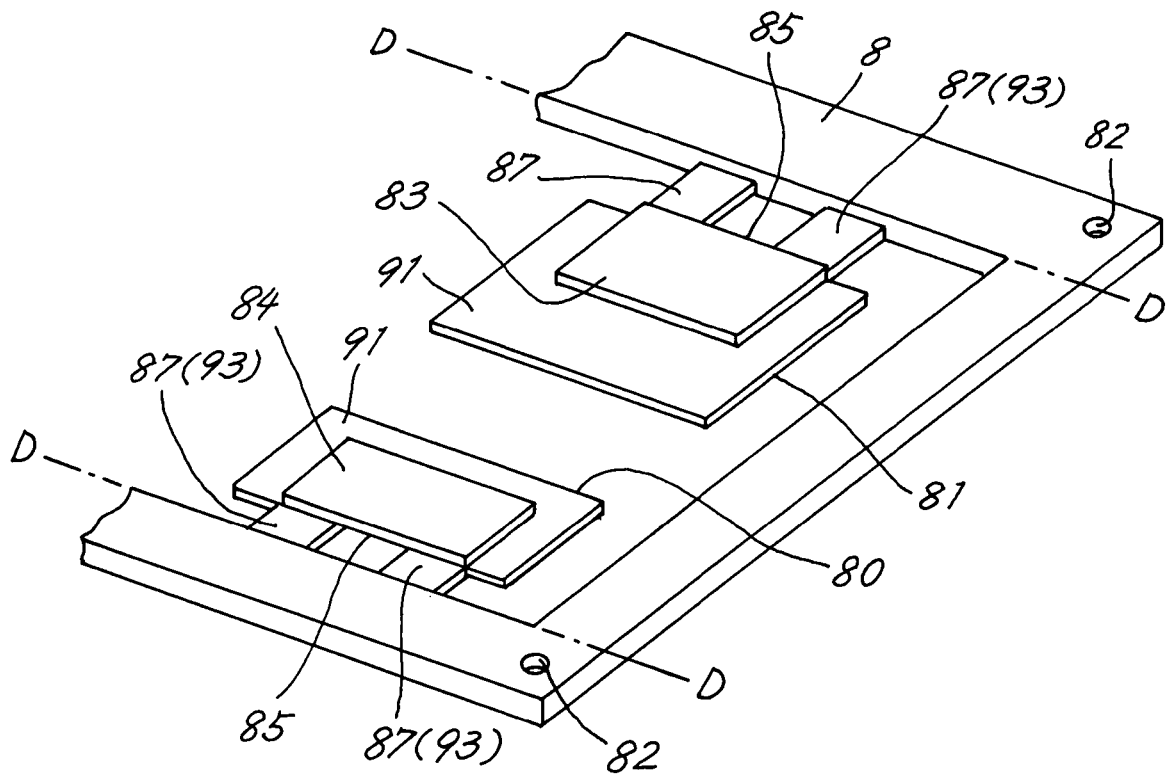
FIG. 14 is a perspective view of the terminal pieces of FIG. 12.

FIG. 13 is a view in section taken along a plane containing the line C—C in FIG. 12, and FIG. 14 is a perspective view of the pair of terminal pieces 83, 84 of FIG. 12. The central portions only of the terminal pieces 83, 84 are flush with the lower surface of the metal plate 8, and the lower surface peripheral portions of the terminal pieces 83, 84 and the connectors 87 are recessed to approximately the same depth.

Figure 15:
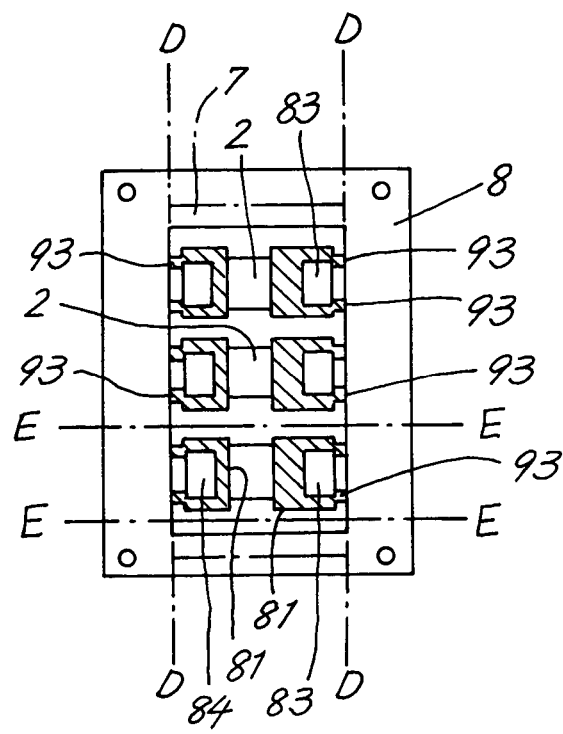
FIG. 15 is a rear view of the metal plate after molding.

With reference to FIG. 15, the capacitor element 2 is placed on the terminal pieces 83, 84 across the first opening 80. Support jigs 5 are thereafter inserted through the jig passing holes 82 of the metal plate 8, which is in turn held from above by pressure means (not shown) and fixed onto the jigs 5 (see FIG. 7). A die 50 is provided over the metal plate 8 from above, and a molten resin is injected into the die 50 through a gate 51, whereby portions of the molten resin fill up the resin passing holes 85, 85, the filling portions 92 and the recesses 93. The resin block 7 obtained is cut by a cutting tool, such as a dicing saw, along planes containing the respective lines D—D and lines E—E shown in FIG. 15, whereby the solid electrolytic capacitor 1 is obtained.

By the above process, the applicant fabricated twenty solid electrolytic capacitors 1 wherein the recesses 93 were filled. Also fabricated were twenty conventional solid electrolytic capacitors 1 (Conventional Example 2) shown in FIG. 18. The capacitors were checked for the burrs formed from the lead frames 9, 90. Table 2 shows the average value of burrs 94 formed. The term "Burrs on bottom face" in Table 2 refers to the height (indicated at H in FIG. 9) of projection of burrs 94, and the term "Burrs on side face" refers to the amount of projection of burrs 94 laterally of the housing 70. The feed speed of the dicing saw was 30 mm/sec.

TABLE 2

|  | Burrs on bottom face | Burrs on side face |
| --- | --- | --- |
| Conventional Ex. 2 | At least 40 μm | At least 5 μm |
| Embodiment | 0 μm | Smaller than 5 μm |

Table 2 indicates that the burrs on the bottom face and side face are eliminated or made smaller than in the prior art. The deburring step can therefore be dispensed with to reduce the number of steps to be included in the fabrication process.

Further the resin covering the recesses 93 enhances the strength of joint between the housing 70 and the lead frames 9, 90 as is the case with the first embodiment.

What is claimed is:

1. A solid electrolytic capacitor comprising a capacitor element having an anode body provided with a cathode layer over an outer surface thereof, an anode-side and a cathode-side lead frame attached to a lower surface of the capacitor element, and a housing covering the lead frames and the capacitor element except lower surfaces of the lead frames,
wherein the housing covers at least a portion of an outer end face of each of the lead frames, the outer end face of each lead frame being provided with an indentation forming a filling portion filled with a resin forming the housing.

2. A solid electrolytic capacitor according to claim 1 wherein in section, the indentation is defined by projections positioned respectively above and below the indentation, or is recessed, V-shaped, S-shaped or wedge-shaped.

3. A solid electrolytic capacitor comprising a capacitor element having an anode body provided with a cathode layer over an outer surface thereof, an anode-side and a cathode-side lead frame attached to a lower surface of the capacitor element, and a housing covering the lead frames and the capacitor element except lower surfaces of the lead frames, the housing having a side surface in the form of a cutting surface formed by a cutting tool, wherein an end portion lower face of each of the lead frames is positioned in the cutting surface of the housing and provided with a recess, the recess being covered with a resin forming the housing to prevent the end portion lower face of each lead frame from being exposed.

4. A solid electrolytic capacitor according to claim 1 wherein a recessed face is formed in the lower surface of each lead frame and filled with the resin forming the housing.

5. A solid electrolytic capacitor according to claim 1 wherein the lower surface of the capacitor element is covered with the cathode-side lead frame.

* * * * *